(12) United States Patent
Hayashi et al.

(10) Patent No.: US 12,076,693 B2
(45) Date of Patent: Sep. 3, 2024

(54) HOLLOW-FIBER MEMBRANE MODULE

(71) Applicant: SUMITOMO ELECTRIC FINE POLYMER, INC., Osaka (JP)

(72) Inventors: Fumihiro Hayashi, Osaka (JP); Yasuhiko Muroya, Osaka (JP); Takamasa Hashimoto, Osaka (JP); Atsushi Uno, Osaka (JP); Yoshimasa Suzuki, Osaka (JP)

(73) Assignee: SUMITOMO ELECTRIC FINE POLYMER, INC., Osaka (JP)

( * ) Notice: Subject to any disclaimer, the term of this patent is extended or adjusted under 35 U.S.C. 154(b) by 641 days.

(21) Appl. No.: 17/279,119

(22) PCT Filed: Sep. 20, 2019

(86) PCT No.: PCT/JP2019/037072
§ 371 (c)(1),
(2) Date: Mar. 24, 2021

(87) PCT Pub. No.: WO2020/075482
PCT Pub. Date: Apr. 16, 2020

(65) Prior Publication Data
US 2021/0394122 A1  Dec. 23, 2021

(30) Foreign Application Priority Data

Oct. 12, 2018  (JP) .................................. 2018-193633

(51) Int. Cl.
*B01D 63/04* (2006.01)
*B01D 63/02* (2006.01)

(52) U.S. Cl.
CPC .......... *B01D 63/04* (2013.01); *B01D 63/031* (2022.08); *B01D 2313/02* (2013.01);
(Continued)

(58) Field of Classification Search
CPC .... B01D 63/04; B01D 63/02; B01D 2313/02; B01D 2313/025; B01D 2313/04;
(Continued)

(56) References Cited

U.S. PATENT DOCUMENTS

2017/0100701 A1  4/2017  Kim et al.
2019/0015787 A1  1/2019  Oh et al.
2019/0201850 A1  7/2019  Ariji et al.

FOREIGN PATENT DOCUMENTS

CN  106102881 A  11/2016
CN  107771365 A  3/2018
(Continued)

OTHER PUBLICATIONS

Machine-generated English translation of JP 2010-071619, generated on Sep. 8, 2023.*
(Continued)

*Primary Examiner* — Fred Prince
(74) *Attorney, Agent, or Firm* — Faegre Drinker Biddle & Reath LLP

(57) ABSTRACT

A hollow-fiber membrane module according to an embodiment of the present disclosure includes a rectangular tubular outer casing with at least one sidewall being open, the outer casing having a plurality of open ports, and an inner casing configured such that a plurality of hollow-fiber membranes aligned in a longitudinal direction of the outer casing are placeable in the inner casing and configured to be insertable into the one sidewall.

4 Claims, 5 Drawing Sheets

(52) U.S. Cl.
CPC .... *B01D 2313/025* (2013.01); *B01D 2313/04* (2013.01); *B01D 2313/205* (2022.08); *B01D 2313/21* (2013.01); *B01D 2313/44* (2013.01); *B01D 2315/10* (2013.01); *B01D 2319/04* (2013.01); *Y02E 60/50* (2013.01)

(58) Field of Classification Search
CPC ............ B01D 2313/20; B01D 2313/21; B01D 2313/44; B01D 2313/56; B01D 2315/10; B01D 2319/04; Y02E 60/50
USPC .................................................... 210/321.89
See application file for complete search history.

(56) References Cited

FOREIGN PATENT DOCUMENTS

| | | | |
|---|---|---|---|
| JP | H11-5024 A | | 1/1999 |
| JP | 2004-524140 A | | 8/2004 |
| JP | 2010-071618 A | | 4/2010 |
| JP | 2010-071619 A | | 4/2010 |
| JP | 2010-127582 A | * | 6/2010 |
| JP | 2015-112530 A | | 6/2015 |
| KR | 20150078538 A | * | 7/2015 |
| KR | 20160038227 A | * | 4/2016 |
| KR | 20170122453 A | * | 11/2017 |
| WO | WO-2018/034153 A1 | | 2/2018 |

OTHER PUBLICATIONS

Machine-generated English translation of JP 2010-127582, generated on Sep. 8, 2023.*

Machine-generated English translation of KR 20150078538, generated on Jan. 13, 2024.*

Machine-generated English translation of KR 20170122453, generated on Jan. 13, 2024.*

* cited by examiner

HOLLOW-FIBER MEMBRANE MODULE

TECHNICAL FIELD

The present disclosure relates to a hollow-fiber membrane module. The present application claims priority from Japanese Patent Application No. 2018-193633 filed on Oct. 12, 2018, and the entire contents of the Japanese patent application are incorporated herein by reference.

BACKGROUND ART

In order to filter various untreated liquids, a so-called cross-flow hollow-fiber membrane module is used in which a plurality of hollow-fiber membranes aligned in one direction are housed in a cylindrical casing, an untreated liquid is supplied from an untreated liquid nozzle provided at one end portion of the casing, a filtered liquid that has permeated into inner spaces of the hollow-fiber membranes is discharged from a filtered liquid nozzle provided at the other end portion of the casing, and a concentrated liquid obtained by concentrating the untreated liquid is discharged from a concentrated liquid nozzle provided at a side face near the other end portion of the casing.

A cylindrical body is widely used as the casing of such a hollow-fiber membrane module. After a plurality of hollow-fiber membranes are inserted into the casing in the axial direction, both end portions of the cylindrical body are sealed. In general, the end portions of the cylindrical body are sealed by means of fixing lids with screws (refer to Japanese Unexamined Patent Application Publication No. 11-5024).

CITATION LIST

Patent Literature

PTL 1: Japanese Unexamined Patent Application Publication No. 11-5024

SUMMARY OF INVENTION

A hollow-fiber membrane module according to an embodiment of the present disclosure includes a rectangular tubular outer casing with at least one sidewall being open, the outer casing having a plurality of open ports; and an inner casing configured such that a plurality of hollow-fiber membranes aligned in a longitudinal direction of the outer casing are placeable in the inner casing and configured to be insertable into the one sidewall.

DESCRIPTION OF EMBODIMENTS

Figure 1:
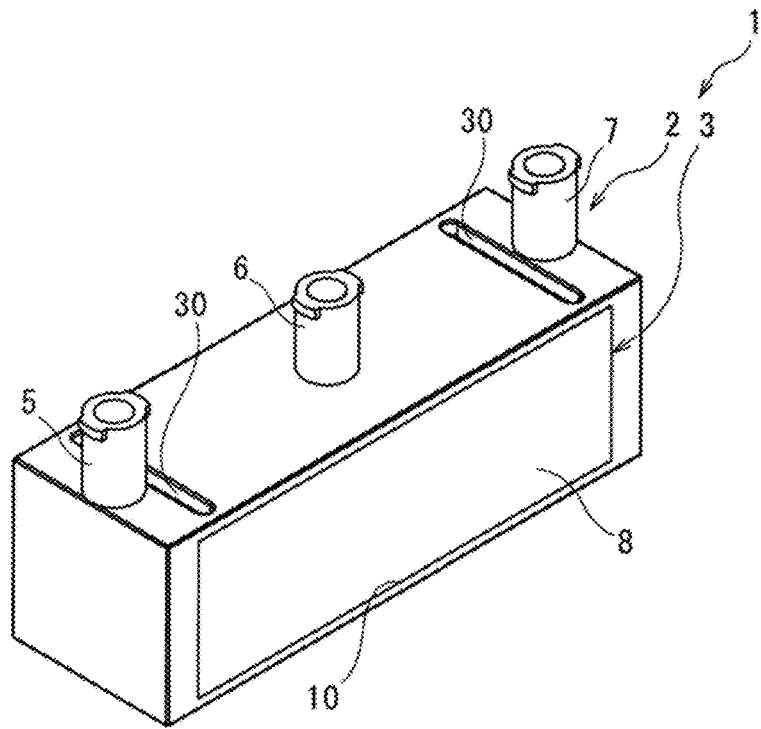
FIG. 1 is a schematic perspective view of a hollow-fiber membrane module according to a first embodiment of the present disclosure.
Figure 2:
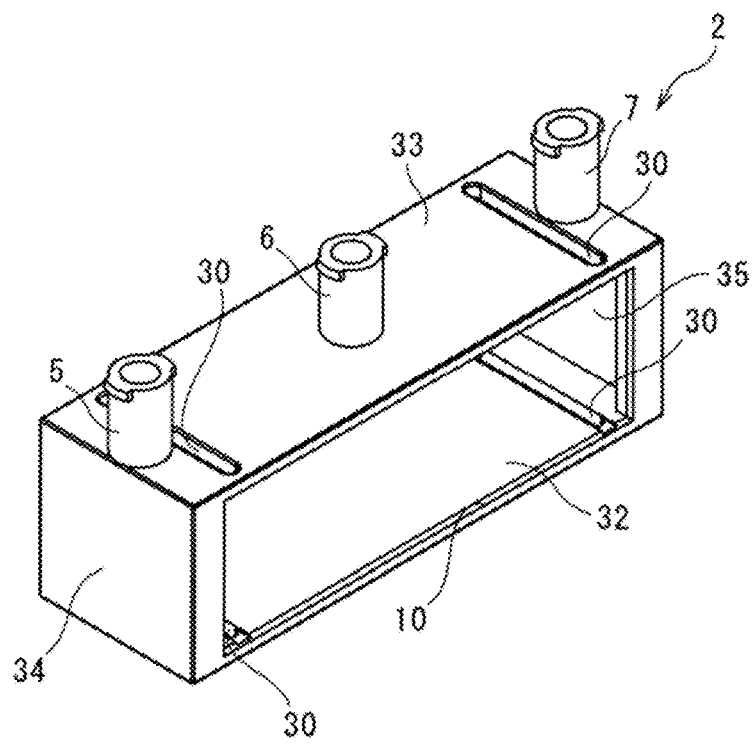
FIG. 2 is a schematic perspective view of an outer casing of the hollow-fiber membrane module according to the first embodiment of the present disclosure.

Problems to be Solved by Present Disclosure

Hollow-fiber membrane modules are required to have further improved separation performance. One possible means for improving the separation performance is to increase a packing ratio of hollow-fiber membranes in a hollow-fiber membrane module. However, in the case of using the cylindrical casing of the hollow-fiber membrane module in the related art, it is not easy to significantly improve the packing ratio of hollow-fiber membranes.

The present disclosure has been made on the basis of the circumstances described above. An object of the present disclosure is to provide a hollow-fiber membrane module in which the packing ratio of hollow-fiber membranes can be increased to improve the separation performance.

Advantageous Effects of Present Disclosure

According to the hollow-fiber membrane module according to an embodiment of the present disclosure, the packing ratio of hollow-fiber membranes can be increased to improve the separation performance.

DESCRIPTION OF EMBODIMENTS OF PRESENT DISCLOSURE

The inventors of the present invention considered that, in order to improve the packing ratio of hollow-fiber membranes in a hollow-fiber membrane module, it is effective that the casing of the hollow-fiber membrane module has a rectangular tubular shape, and conducted studies. On the other hand, in the case where the casing of the hollow-fiber membrane module has a rectangular tubular shape, it is difficult to apply the screw structure used in cylindrical modules to ends of the casing. In view of this, the inventors considered that sealing of the ends of the casing can be facilitated by adopting a specific structure as means for sealing the casing and arrived at the present invention.

A hollow-fiber membrane module according to an embodiment of the present disclosure includes a rectangular tubular outer casing with at least one sidewall being open, the outer casing having a plurality of open ports, and an inner casing configured such that a plurality of hollow-fiber membranes aligned in a longitudinal direction of the outer casing are placeable in the inner casing and configured to be insertable into the one sidewall.

In the hollow-fiber membrane module, since the casing of the hollow-fiber membrane module has a rectangular tubular shape, a large number of hollow fibers can be enclosed in the casing compared with a cylindrical casing. Therefore, the packing ratio of hollow-fiber membranes in the hollow-fiber membrane module can be increased to improve separation performance, and it is possible to provide a high-performance module having higher filtration performance or higher degassing performance. In addition, the hollow-fiber membrane module includes the rectangular tubular outer casing with at least one sidewall being open, and the inner casing configured such that a plurality of hollow-fiber membranes aligned in a longitudinal direction of the outer casing are placeable in the inner casing and configured to be insertable into the one sidewall. With this configuration, after the hollow-fiber membranes are inserted into the casing, the casing can be easily sealed without adopting a screw structure as means for sealing the outer casing.

The plurality of open ports are preferably provided at one wall of the outer casing. This configuration of the plurality of open ports that are exclusively provided at one wall facilitates the installation of the hollow-fiber membrane module in equipment and enables the installation space to be compact.

A packing ratio of the hollow-fiber membranes relative to the outer casing is preferably 10% or more.

When the packing ratio of the hollow-fiber membranes in the hollow-fiber membrane module is 10% or more, the separation performance can be further improved. Herein, the "packing ratio of the hollow-fiber membranes" refers to a packing density of the hollow-fiber membranes packed in the outer casing and is a ratio (%) of the sum of cross-sectional areas occupied by the hollow-fiber membranes in a cross section, the cross-sectional areas being determined by the outer diameters of the hollow-fiber membranes, to the area of the cross section, the cross section being perpendicular to a length direction of the hollow-fiber membranes in an inner space formed by the inner surfaces of the outer casing (refers to a packing ratio based on the outer diameters of the hollow-fiber membranes).

A side plate of the inner casing preferably functions as a lid for the one sidewall. With this configuration, after the hollow-fiber membranes are inserted into the casing, the casing can be easily sealed without adopting a screw structure as means for sealing the outer casing.

DETAILS OF EMBODIMENTS OF PRESENT DISCLOSURE

Hollow-fiber membrane modules according to embodiments of the present disclosure will be described in detail below with reference to the drawings.

First Embodiment

FIG. 1 to FIGS. 3A and 3B each illustrate a hollow-fiber membrane module according to a first embodiment of the present disclosure. A hollow-fiber membrane module 1 according to the first embodiment includes an inner casing 3 and an outer casing 2 that houses the inner casing 3. The outer casing 2 has a rectangular tubular shape and has a plurality of open ports, and at least one sidewall of the outer casing 2 is open. The inner casing 3 is configured such that a plurality of hollow-fiber membranes 4 aligned in the longitudinal direction of the outer casing 2 are placeable in the inner casing 3 and configured to be insertable into the one sidewall of the outer casing 2. The hollow-fiber membrane module 1 is used in applications for various membrane separations such as filtration and degassing. Accordingly, an object that permeates through the hollow-fiber membranes 4 in the hollow-fiber membrane module 1 varies according to the applications such as filtration and degassing. For example, when the hollow-fiber membrane module 1 is used as a filtration module, the hollow-fiber membranes are permeable to a solvent in an untreated liquid, while preventing the permeation of impurities contained in the untreated liquid and having a certain particle size or more. When the hollow-fiber membrane module 1 is used as a degassing module, the hollow-fiber membranes are permeable to either a liquid or a gas.

In the hollow-fiber membrane module 1, since the casing of the hollow-fiber membrane module has a rectangular tubular shape, a large number of hollow-fibers can be enclosed in the casing compared with a cylindrical casing. Therefore, the packing ratio of the hollow-fiber membranes in the hollow-fiber membrane module can be increased to improve separation performance, and it is possible to provide a high-performance module having higher filtration performance or higher degassing performance. Furthermore, since the casing of the hollow-fiber membrane module has a rectangular tubular shape, the installation of the hollow-fiber membrane module in equipment is facilitated. In addition, the hollow-fiber membrane module includes the rectangular tubular outer casing with at least one sidewall being open, and the inner casing configured such that a plurality of hollow-fiber membranes aligned in a longitudinal direction of the outer casing are placeable in the inner casing and configured to be insertable into the one sidewall. With this configuration, the outer casing 2 can be easily sealed without adopting a screw structure as means for sealing the outer casing 2.

Structural elements of the hollow-fiber membrane module will be described in detail below.

<Outer Casing>

As illustrated in FIG. 1 to FIGS. 3A and 3B, the rectangular tubular outer casing 2 includes a top wall 33, a bottom wall 32, and a pair of opposite sidewalls 34 and 35, and the other two opposite sidewalls of the outer casing 2 are each open.

That is, the outer casing 2 has an opening 10 and an opening (not illustrated) facing the opening 10. The outer casing 2 has a plurality of open ports 5, 6, and 7.

The outer casing 2 houses the inner casing 3 in which a bundle of hollow-fiber membranes 4 formed from a plurality of hollow-fiber membranes 4 is placed. The inner casing 3 is inserted from the opening 10 of the outer casing 2. When the outer casing 2 is configured such that the inner casing 3 is insertable, the inner casing 3 is replaceable.

Examples of the materials of the structural elements of the outer casing 2 include metals such as iron, stainless steel, and aluminum; and resin compositions that contain, as a main component, PTFE (polytetrafluoroethylene), polyvinyl chloride, polyethylene, an ABS resin (acrylonitrile-butadiene-styrene copolymer), or the like. The structural elements may each be composed of different materials.

(Open Port)

The outer casing 2 has a plurality of open ports 5, 6, and 7.

The open ports refer to inlets and outlets of a fluid, the inlet and outlets being inlets and outlets for supplying a liquid and collecting a liquid or gas that has been allowed to permeate. The open port 5, the open port 6, and the open port 7 each have, at an outer end portion thereof, a joint structure to which a pipe can be connected. Examples of the joint structure include ferrules, flanges, and exterior threads.

The open port 5, the open port 6, and the open port 7 are provided at the top wall 33 of the outer casing 2. The open port 5 and the open port 7 are each located closer to an end portion of the top wall 33 relative to a sealing hole 30 described later. The open port 6 is provided at a central portion between the open port 5 and the open port 7. The plurality of open ports are preferably provided at one wall of the outer casing 2 as described above. This configuration of the plurality of open ports that are exclusively provided at the one wall facilitates the installation of the hollow-fiber membrane module in equipment and enables the installation space to be compact. The number of open ports is not particularly limited. The open ports can be applied to wiring paths of a pressure sensor or the like besides the application as inlets and outlets of a fluid. Herein, the "one wall" means that, for example, any wall of the top wall, the bottom wall, and the pair of opposite two sidewalls that constitute the outer peripheral surfaces of the outer casing is identical.

The lower limit of the diameter of each of the open port 5, the open port 6, and the open port 7 is preferably 2 mm, and more preferably 3 mm. On the other hand, the upper limit of the diameter of each of the open ports is preferably 30 mm, and more preferably 20 mm. If the diameter of the open port is less than the lower limit, the open port may tend to be clogged with foreign substances. On the other hand, if the diameter of the open port exceeds the upper limit, the flow rate decreases, and sediment may be generated.

<Inner Casing>

The inner casing 3 is configured such that a plurality of hollow-fiber membranes aligned in the longitudinal direction of the outer casing 2 are placeable therein. The inner casing 3 allows a plurality of hollow-fiber membranes 4 to be integrated by side plates 8 and sealing portions 36 and holds the plurality of hollow-fiber membranes 4 in the outer casing 2 while aligning the hollow-fiber membranes 4 in one direction. The inner casing 3 is configured to be insertable into the opening 10 of the outer casing 2.

(Hollow-Fiber Membrane)

The hollow-fiber membranes 4 are hollow-fiber-like separation membranes. No particular limitation is imposed on the material, membrane form, membrane morphology, and the like of the hollow-fiber membranes 4. For example, hollow-fiber membranes containing a resin as a main component can be used. Herein, the term "main component" refers to a component having the highest content.

Examples of the resin include polyolefin-based resins such as polyethylene, polypropylene, and poly(4-methylpentene-1), silicon-based resins such as polydimethylsiloxane and copolymers thereof, fluorine-based resins such as polytetrafluoroethylene, modified polytetrafluoroethylene, and polyvinylidene fluoride, ethylene-vinyl alcohol copolymers, polyamides, polyimides, polyetherimide, polystyrene, polysulfones, polyvinyl alcohol, polyphenylene ether, polyphenylene sulfide, cellulose acetate, and polyacrylonitrile. Of these, PTFE, which has, for example, good mechanical strength, chemical resistance, heat resistance, weather resistance, and non-flammability is porous, is preferred. The material for forming the hollow-fiber membranes 4 may contain, for example, other polymers and additives such as a lubricant, as required.

Examples of the form of sidewalls of the hollow-fiber membranes 4 include porous membranes, microporous membranes, and homogeneous membranes that do not have porosity (non-porous membranes). Examples of the membrane morphology of the hollow-fiber membranes 4 include symmetrical membranes (homogeneous membranes) in which the chemical or physical structure of the whole membranes is homogeneous and asymmetric membranes (heterogeneous membranes) in which the chemical or physical structure of the membranes differs between portions of the membranes. The asymmetric membranes (heterogeneous membranes) are membranes having a non-porous dense layer and a porous layer. In such a case, the dense layer may be formed at any portion of the membrane, such as a surface layer portion of the membrane or the inside of the porous membrane. The heterogeneous membranes include composite membranes having different chemical structures and membranes having a multilayer structure such as a three-layer structure.

The lower limit of the packing ratio of the hollow-fiber membranes in the hollow-fiber membrane module 1 is preferably 10%, and more preferably 15%. On the other hand, the upper limit of the packing ratio of the hollow-fiber membranes is preferably 90%, and more preferably 80%. If the packing ratio of the hollow-fiber membranes is less than the lower limit, the separation performance of the hollow-fiber membrane module 1 may decrease. Conversely, if the packing ratio of the hollow-fiber membranes exceeds the upper limit, the hollow-fiber membranes may be crushed when the hollow-fiber membranes are packed in a container or difficulties may be caused during packing of the hollow-fiber membranes in the outer casing 2. When the packing ratio of the hollow-fiber membranes is 10% or more, the hollow-fiber membrane module 1 can have further improved separation performance.

(Sealing Portion)

The sealing portions 36 hold both end portions of the plurality of hollow-fiber membranes 4 to thereby hold the plurality of hollow-fiber membranes 4 while aligning the hollow-fiber membranes 4 in one direction without entanglement.

The sealing portions 36 are formed of a resin. Specifically, in the sealing portions 36, spaces between the hollow-fiber membranes 4 are filled with a resin. Examples of the resin used as the sealing portions 36 include epoxy resins, urethane resins, UV-curable resins, fluorine-containing resins, polyamide resins, and polyolefin resins such as polyethylene and polypropylene. Of these, epoxy resins and urethane resins are more preferred from the viewpoint of the performance of adhesives.

Figure 3A:
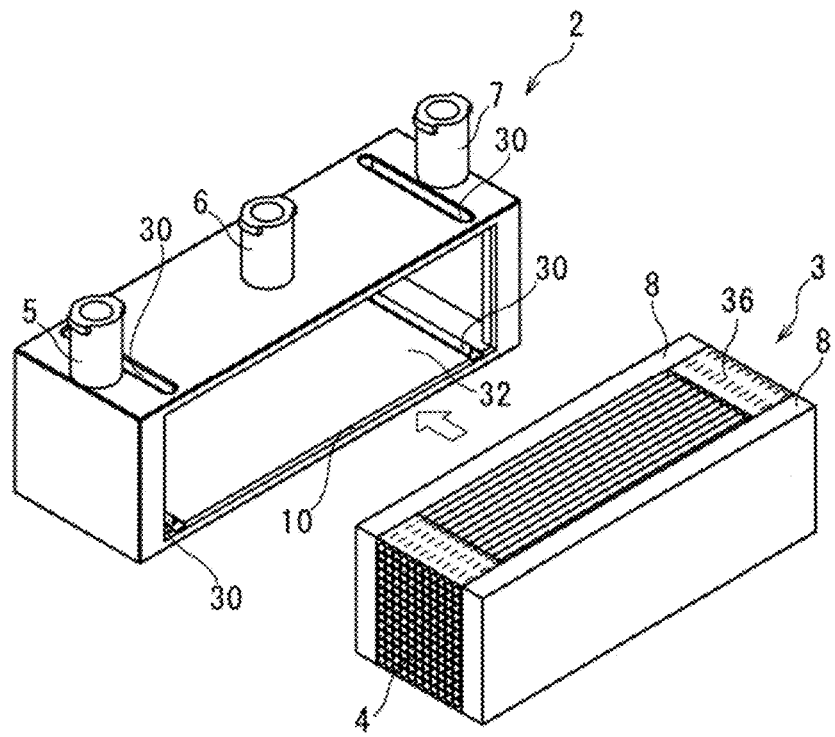
FIG. 3A is a schematic perspective view illustrating a procedure of inserting an inner casing of the hollow-fiber membrane module according to the first embodiment of the present disclosure.

As illustrated in FIG. 3A, the sealing portions 36 do not fill the inside of the hollow-fiber membranes 4 but fill only spaces between the hollow-fiber membranes 4 and spaces between the hollow-fiber membranes 4 and an inner wall of each of the side plates 8.

(Sealing Hole)

Figure 4:
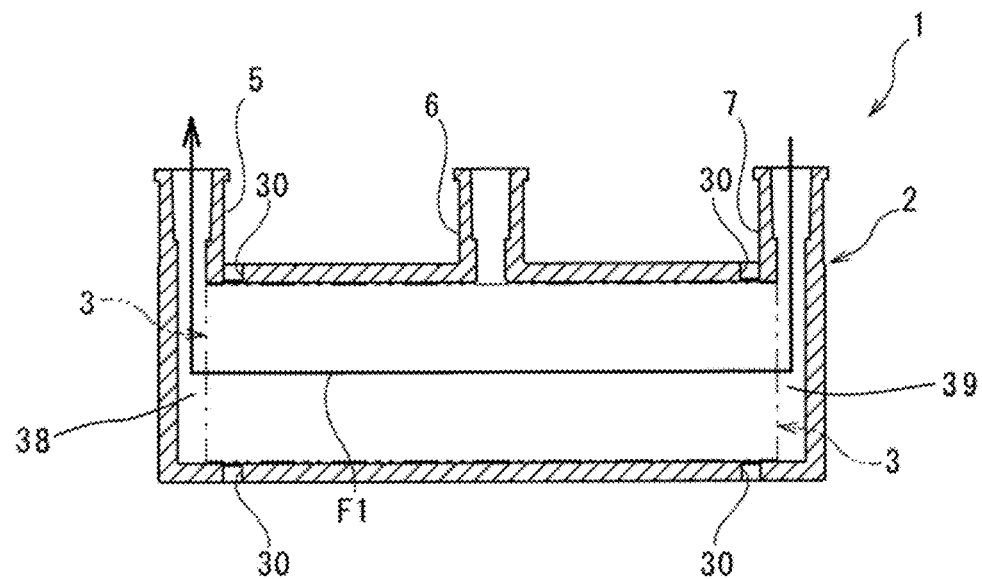
FIG. 4 is a schematic cross-sectional view illustrating a flow path of a liquid in the hollow-fiber membrane module according to the first embodiment of the present disclosure.

The outer casing 2 has two sealing holes 30 in each of the top wall 33 and the bottom wall 32. The sealing holes 30 are provided for the purpose of, after the inner casing 3 is inserted from the opening of the outer casing 2, performing sealing for filling gaps between the upper surface of both end portions of the inner casing 3 in the longitudinal direction and an inner wall of the outer casing 2 and gaps between the lower surface of both end portions of the inner casing 3 in the longitudinal direction and another inner wall of the outer casing 2. That is, the four sealing holes 30 are configured to form openings such that gaps between each end portion of the inner casing 3 in the longitudinal direction and the inner walls of the outer casing 2 can be filled with a sealant. More specifically, the sealant fills only gaps between each of the upper and lower surfaces of both end portions of the inner casing 3 in the longitudinal direction and the corresponding inner wall of the outer casing 2. The inner casing 3 is fixed to the inside of the outer casing 2 by charging the sealant from the sealing holes 30. The inner casing 3 and the outer casing 2 are bonded and sealed with the sealant to thereby hermetically hold both end portions of the inner casing 3 in the longitudinal direction and to thereby open both end portions of the outer casing 2 in the longitudinal direction. Since both end portions of the outer casing 2 in the longitudinal direction are opened in this manner, first communication paths 38 and the second communication path 39 functioning as flow paths of a fluid are formed as illustrated in FIG. 4.

The sealant is not limited as long as the sealant has high adhesion to the hollow-fiber membranes 4 and can be cured in a support. In particular, when PTFE is used as the main component of the hollow-fiber membranes 4, the main component of the filling material is preferably an epoxy resin and polyurethane, which have high adhesion to PTFE and can reliably prevent the hollow-fiber membranes 4 from being detached. Filling the four sealing holes 30 with the sealant enables the space between the support and the hollow-fiber membranes 4 to be hermetically sealed and can prevent an untreated liquid that has not yet been filtered from entering from the outside and mixing with a treated liquid that has been filtered.

(Side Plate)

As illustrated in FIG. 3A, the two side plates 8 are members that come in contact with both side portions of the bundle of the plurality of hollow-fiber membranes 4 in the longitudinal direction and support the hollow-fiber membranes 4. The side plates 8 are configured to be insertable from the opening 10 into the inside of the outer casing 2 and have a function of lids for the pair of open opposite sidewalls of the outer casing 2. Specifically, the external dimensions of each of the side plates 8 are substantially equal to the external dimensions of the opening 10 of the outer casing 2. The thickness of each of the side plates 8 can be appropriately determined within a range in which the length of the inner casing 3 in the width direction orthogonal to the longitudinal direction is substantially equal to the inside dimension of the outer casing 2 in the width direction.

Figure 3B:
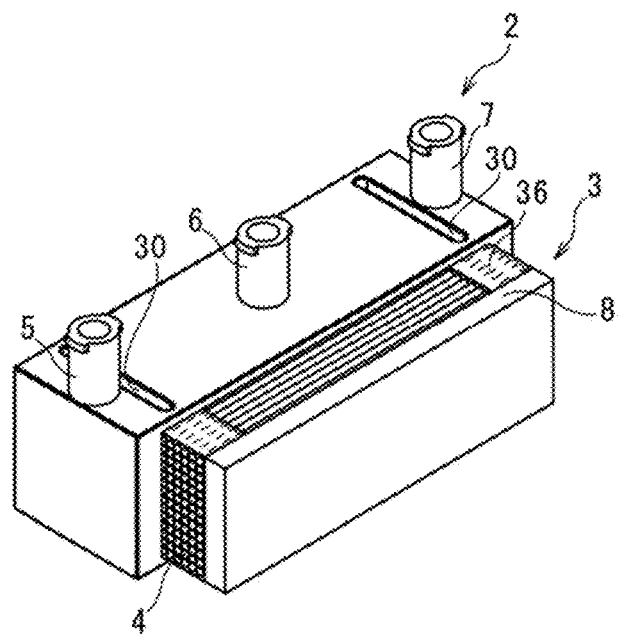
FIG. 3B is a schematic perspective view illustrating a procedure of inserting an inner casing of the hollow-fiber membrane module according to the first embodiment of the present disclosure.

In the inner casing 3, the bundle of the plurality of hollow-fiber membranes 4 aligned in one direction is disposed between the two side plates 8. That is, the bundle of the hollow-fiber membranes 4 is disposed so as not to protrude from end faces of the two side plates 8 on one side and end faces of the two side plates 8 on the other side. In this case, the length of each of the side plates 8 in the longitudinal direction is preferably equal to the length of each of the hollow-fiber membranes 4 but may be shorter than the length of each of the hollow-fiber membranes 4. In FIGS. 3A and 3B, the length of each of the side plates 8 in the longitudinal direction is equal to the length of each of the hollow-fiber membranes 4. FIGS. 3A and 3B illustrate a case where both end faces of each of the hollow-fiber membranes 4 in the longitudinal direction coincide with both ends of the two side plates 8 in the longitudinal direction.

The side plates 8 may be formed by using the same material as that of the outer casing 2.

Example of Method for Degassing Liquid with Hollow-Fiber Membrane Module of First Embodiment Next, a method for degassing a liquid with the hollow-fiber membrane module 1 of the first embodiment will be described with reference to FIG. 4. A hollow-fiber membrane degassing module will now be described as an example of a hollow-fiber membrane module. The hollow-fiber membrane module 1 of the first embodiment illustrated in FIG. 4 is an internal flow-type module in which a liquid is supplied to the inside of hollow-fiber membranes 4 and is allowed to permeate therethrough, while the pressure outside the hollow-fiber membranes 4 is reduced to thereby degas the liquid in the hollow-fiber membranes 4. Since the hollow-fiber membrane module 1 is the internal flow-type module, the diffusion direction is the radiation direction, and thus the diffusion efficiency can be further enhanced. The open port 7 is a liquid supply port, the open port 5 is a liquid discharge port, and the open port 6 is a gas discharge port. As described in detail below, the open port 7 communicates with a second communication path 39, and the open port 5 communicates with a first communication path 38.

As illustrated in FIG. 4, the outer casing 2 includes the first communication path 38 and the second communication path 39 on both ends portions in the longitudinal direction. As described above, the inner casing 3 is inserted into the outer casing 2, and an adhesive is injected from the sealing holes 30 to seal the outer casing 2 and the inner casing 3. Consequently, the first communication path 38 and the second communication path 39 are formed on both end portions in the longitudinal direction. With this configuration, as shown by arrow F1, only a liquid supplied from the open port 7 through the second communication path 39 to the outer casing 2 permeates inside the hollow-fiber membranes 4, flows into the first communication path 38, and is discharged from the open port 5. In addition, the outside of the hollow-fiber membranes 4 communicates with the open port 6. Accordingly, when suction is performed from the open port 6 by using a suction pump (not illustrated), the pressure outside the hollow-fiber membranes 4 is reduced and a gas is discharged from the open port 6 to thereby conduct degassing of the liquid.

Second Embodiment

The hollow-fiber membrane module according to a second embodiment is an external flow-type module in which a liquid is supplied to the outside of hollow-fiber membranes, while the pressure inside the hollow-fiber membranes is reduced to thereby degas the liquid. Since the hollow-fiber membrane module according to the second embodiment is the external flow-type module, pressure loss of the liquid can be suppressed to be low. Parts that are identical or correspond to those in the first embodiment are assigned the same reference numerals, and a description thereof will be omitted.

Figure 5:
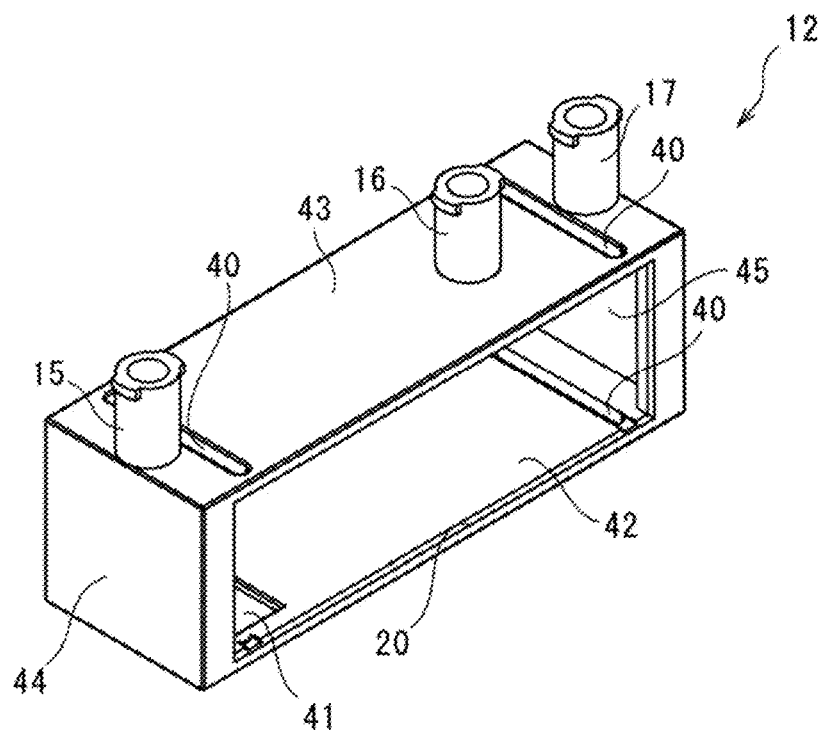
FIG. 5 is a schematic perspective view of an outer casing of a hollow-fiber membrane module according to a second embodiment of the present disclosure.
Figure 6:
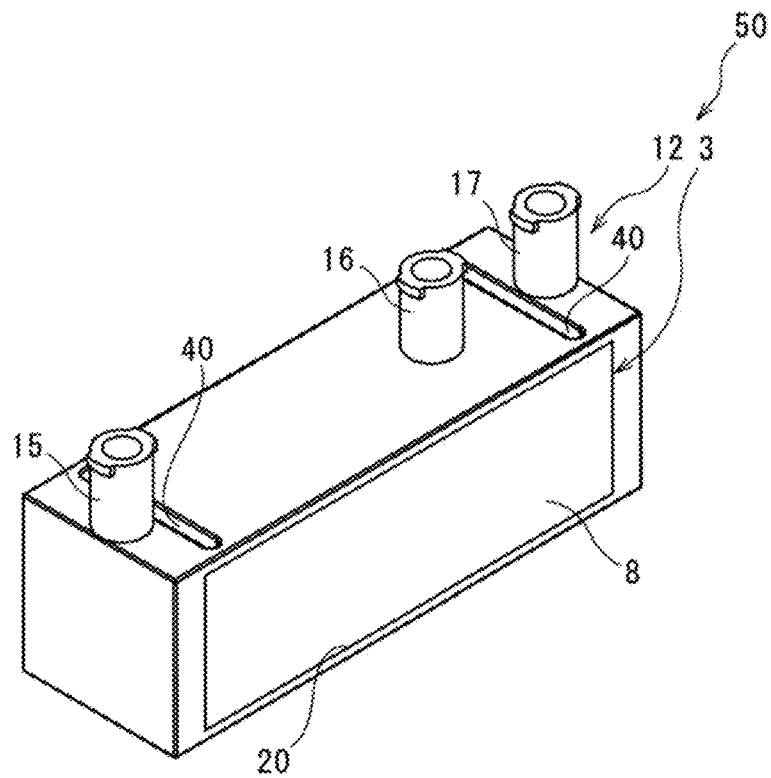
FIG. 6 is a schematic perspective view of the hollow-fiber membrane module according to the second embodiment of the present disclosure.
Figure 7:
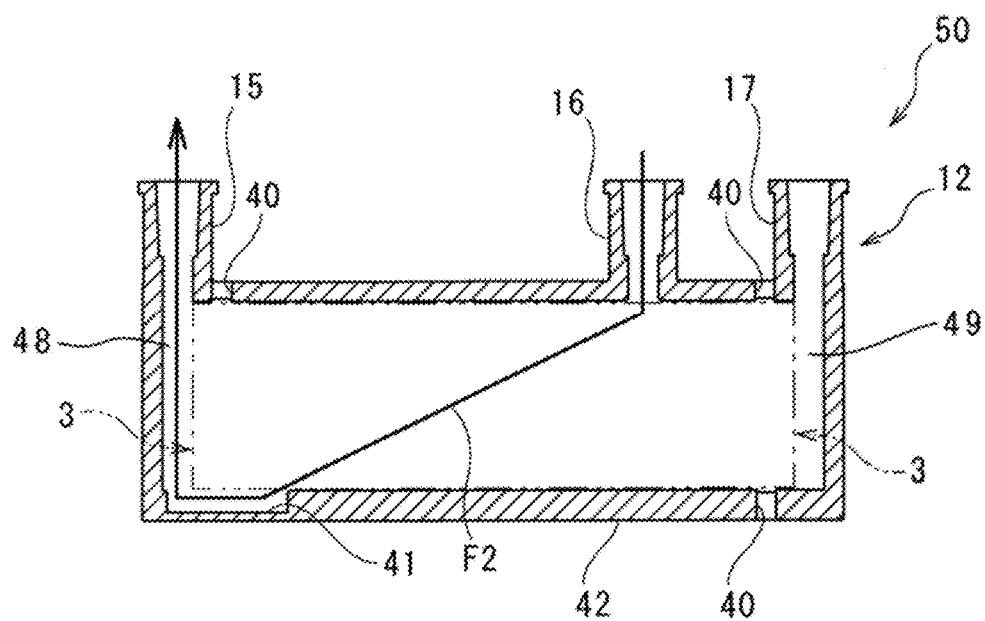
FIG. 7 is a schematic cross-sectional view illustrating a flow path of a liquid in the hollow-fiber membrane module according to the second embodiment of the present disclosure.

A hollow-fiber membrane module 50 according to the second embodiment illustrated in FIGS. 5 to 7 includes a rectangular tubular outer casing 12 and an inner casing 3. Hollow-fiber membranes (not illustrated) in the inner casing 3 of the second embodiment are permeable to gas but are not permeable to liquid. The outer casing 12 includes a top wall 43, a bottom wall 42, and a pair of opposite sidewalls 44 and 45, and the other opposite sidewalls of the outer casing 12 are each open. The outer casing 12 has an opening 20 and an opening (not illustrated) facing the opening 20. The outer casing 12 has a plurality of open ports 15, 16, and 17. The inner casing 3 is inserted into the outer casing 12, and an adhesive is applied from sealing holes 40 to seal the outer casing 12 and the inner casing 3. Consequently, a first communication path 48 and a second communication path 49 are formed on both end portions in the longitudinal direction. The open port 16 is a liquid supply port, the open port 15 is a liquid discharge port, and the open port 17 is a gas discharge port. The open port 17 communicates with the second communication path 49, and the open port 15 communicates with the first communication path 48. A liquid introduction path 41 communicating with the first communication path 48 is provided at one end of the bottom wall 42 of the outer casing 12 in the longitudinal direction.

Example of Method for Degassing Liquid with Hollow-Fiber Membrane Module of Second Embodiment Next, a method for degassing a liquid with the hollow-fiber membrane module 50 will be described with reference to FIG. 7. The hollow-fiber membrane module 50 of the second embodiment is an external flow-type module in which a liquid is supplied from the open port 16 to the outside of hollow-fiber membranes 4, while the pressure inside the hollow-fiber membranes 4 is reduced to thereby degas the liquid. Since the hollow-fiber membrane module 50 is the external flow-type module, pressure loss of the liquid can be suppressed to be low. In the hollow-fiber membrane module 50, as shown by arrow F2, only a liquid supplied from the open port 16 flows from the outside of the hollow-fiber membranes 4 through the liquid introduction path 41 and the first communication path 48 and is discharged from the open port 15. In addition, the inside of the hollow-fiber membranes 4 communicates with the open port 17. Accordingly, when suction is performed from the open port 17 by using a suction pump (not illustrated), the pressure inside the hollow-fiber membranes 4 is reduced and a gas in the liquid outside the hollow-fiber membranes 4 permeates through the hollow-fiber membranes 4 and is discharged from the open port 17 to thereby conduct degassing of the liquid.

Third Embodiment

Figure 8:
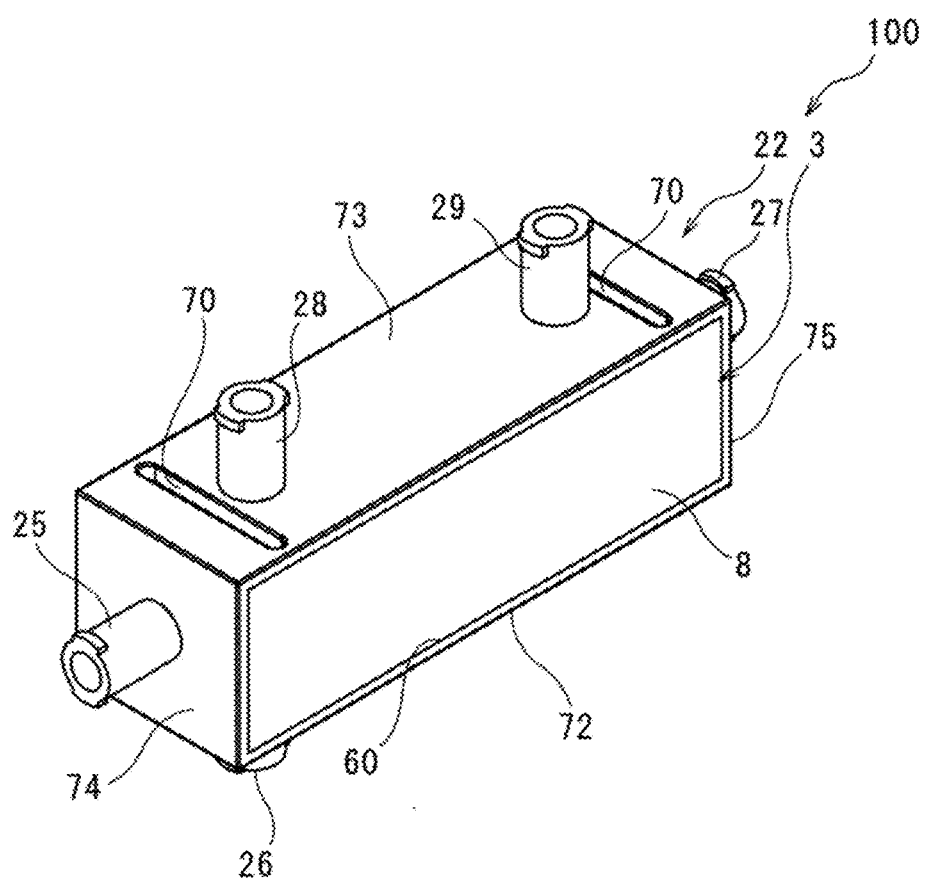
FIG. 8 is a schematic perspective view of a hollow-fiber membrane module according to a third embodiment of the present disclosure.

FIG. 8 illustrates a hollow-fiber membrane module 100 according to a third embodiment of the present disclosure. Parts that are identical or correspond to those in the first embodiment are assigned the same reference numerals, and a description thereof will be omitted. The hollow-fiber membrane module 100 according to the third embodiment includes five open ports 25, 26, 27, 28, and 29. The hollow-fiber membrane module 100 includes a rectangular tubular outer casing 22 and an inner casing 3. The outer casing 22 includes a top wall 73, a bottom wall 72, and a pair of opposite sidewalls 74 and 75, and the other opposite sidewalls of the outer casing 22 are each open. The outer casing 22 has an opening 60 and an opening (not illustrated) facing the opening 60. The inner casing 3 is inserted into the outer casing 22, and an adhesive is applied from sealing holes 70 to seal the outer casing 22 and the inner casing 3. Since the hollow-fiber membrane module according to the third embodiment of the present disclosure includes open ports other than the liquid supply port, the liquid discharge port, and the gas discharge port, the hollow-fiber membrane module can be used in either the internal flow-type module or the external flow-type module depending on the purpose. Furthermore, the other open ports can be applied to wiring paths of a pressure sensor or the like besides the application as inlets and outlets of a fluid.

As described above, according to the hollow-fiber membrane module, the packing ratio of hollow-fiber membranes can be increased to improve the separation performance, and it is possible to provide a high-performance module having higher filter or degassing performance. Since the casing of the hollow-fiber membrane module has a rectangular tubular shape, the installation of the hollow-fiber membrane module in equipment is facilitated. The hollow-fiber membrane module includes a rectangular tubular outer casing with at least one sidewall being open, and an inner casing configured such that a plurality of hollow-fiber membranes aligned in the longitudinal direction of the outer casing are placeable in the inner casing and configured to be insertable into the one sidewall. Accordingly, after the hollow-fiber membranes are inserted into the casing, the casing can be easily sealed without adopting a screw structure as means for sealing the outer casing.

OTHER EMBODIMENTS

It is to be understood that the embodiments disclosed herein are only illustrative and non-restrictive in all respects. The scope of the present invention is not limited to the configurations of the embodiments but is defined by the appended claims. The scope of the present invention is intended to cover all modifications within the meaning and scope equivalent to those of the claims.

In the embodiments described above, the outer casing and the inner casing are fixed to each other with a sealant. Alternatively, the outer casing and the side plates of the inner casing may be fitted to each other to fix the casings.

REFERENCE SIGNS LIST

1, 50, 100 hollow-fiber membrane module
2, 12, 22 outer casing
3 inner casing
4 hollow-fiber membrane
5, 6, 7, 15, 16, 17, 25, 26, 27, 28, 29 open port
8 side plate
10, 20, 60 opening
30, 40, 70 sealing hole
32, 42, 72 bottom wall
33, 43, 73 top wall
34, 35, 44, 45, 74, 75 sidewall
36 sealing portion
38, 48 first communication path
39, 49 second communication path
41 liquid introduction path

The invention claimed is:

1. A hollow-fiber membrane module comprising:
a rectangular tubular outer casing with at least one sidewall being open, the outer casing having a plurality of open ports; and an inner casing configured such that a plurality of hollow-fiber membranes aligned in a longitudinal direction of the outer casing are placeable in the inner casing and configured to be insertable into the one sidewall,
wherein a side plate of the inner casing functions as a lid for the one sidewall.

2. The hollow-fiber membrane module according to claim 1, wherein the plurality of open ports are provided at one wall of the outer casing.

3. The hollow-fiber membrane module according to claim 1, wherein a packing ratio of the hollow-fiber membranes relative to the outer casing is 10% or more.

4. A hollow-fiber membrane module comprising:
a rectangular tubular outer casing with at least one sidewall being open, the outer casing having a plurality of open ports; and an inner casing configured such that a plurality of hollow-fiber membranes aligned in a longitudinal direction of the outer casing are placeable in the inner casing and configured to be insertable into the one sidewall, wherein the outer casing has walls constituting outer peripheral surfaces of the outer casing, the plurality of open ports are provided at one of the walls of the outer casing, and one or more of the plurality of open ports are not provided at the other walls of the outer casing.

* * * * *